United States Patent [19]

Higashi et al.

[11] Patent Number: 4,613,425

[45] Date of Patent: Sep. 23, 1986

[54] PROCESS FOR HYDROTREATING HEAVY HYDROCARBON OILS

[75] Inventors: Hidehiro Higashi; Katsuhiro Shirono, both of Kitakyushu; Yuusaku Arima, Fukuoka; Yoichi Nishimura, Yokohama; Shinichi Yoshida, Kashiwa, all of Japan

[73] Assignee: Catalysts & Chemicals Industries Co., Ltd., Tokyo, Japan

[21] Appl. No.: 572,097

[22] Filed: Jan. 19, 1984

[30] Foreign Application Priority Data

Jan. 21, 1983 [JP] Japan .................................. 58-7421

[51] Int. Cl.$^4$ ............................................. C10G 65/04
[52] U.S. Cl. ...................................... 208/89; 208/211; 208/216 PP; 208/251 H
[58] Field of Search ................. 208/211, 210, 216 PP, 208/251 H, 89

[56] References Cited

U.S. PATENT DOCUMENTS

| Re. 30,155 | 11/1979 | Gustafson | 208/254 H |
|---|---|---|---|
| 3,814,682 | 6/1974 | Christman et al. | 208/216 PP |
| 4,008,149 | 2/1977 | Itoh et al. | 208/251 H |
| 4,297,242 | 10/1981 | Hensley, Jr. et al. | 208/216 PP |
| 4,419,275 | 12/1983 | Yoshida et al. | 502/322 |
| 4,500,645 | 2/1985 | Fuchikami et al. | 502/65 |

Primary Examiner—Brian E. Hearn
Assistant Examiner—O. Chaudhuri
Attorney, Agent, or Firm—Flynn, Thiel, Boutell & Tanis

[57] ABSTRACT

A two-stage process for hydrotreating asphaltenes and metallic contaminants-containing heavy hydrocarbon oils which comprises a demetallization step using a catalyst composition which is smaller in pore size and less in active metal amount than the conventional demetallization catalysts, and a hydrotreating step using a catalyst composition which is larger in pore size and more in active metal amount than the conventional hydrodesulfurization catalysts or hydrocracking catalysts, said hydrotreating step being located downstream of said demetallization step.

6 Claims, 2 Drawing Figures

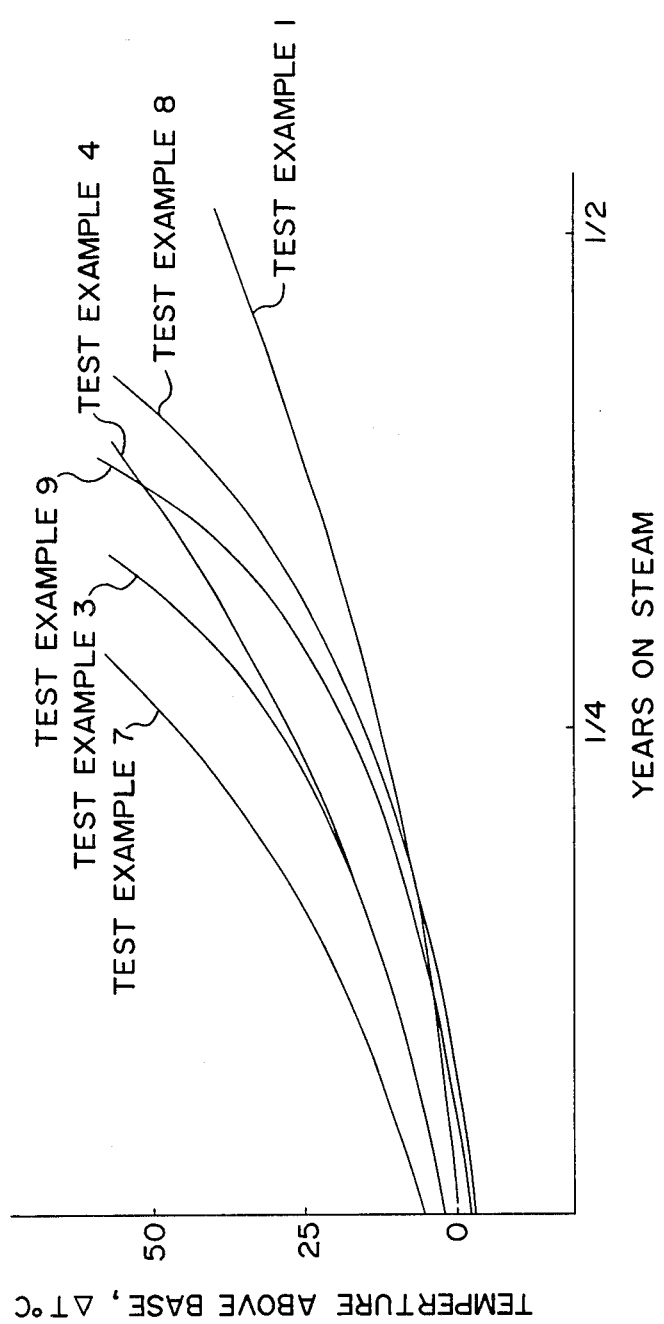

PROCESS FOR HYDROTREATING HEAVY HYDROCARBON OILS

BACKGROUND OF THE INVENTION

The present invention relates to a process for hydrotreating heavy hydrocarbon oils containing asphaltenes and metallic contaminants. In more detail, the present invention relates to a process for treating heavy hydrocarbon oils with hydrogen in the presence of a novel demetallization catalyst and then treating the demetallized hydrocarbon oils in the presence of a novel hydrodesulfurization catalyst or hydrocracking catalyst.

Recently as crude oils have become more heavy, there is a growing tendency that the amounts of asphaltenes and metallic contaminants generally present as organometallic compounds in crude oils and residual oils increase. Also, the metals mainly found in petroleum hydrocarbon oils such as reduced oil and the like and heavy hydrocarbon oils recovered from tar sand, oil shale and the like by a well known dry distillation are nickel, vanadium and iron. These metals are present in heavy oils in a free state. However, considerable amounts of said metals are present in asphaltenes and other high molecular compounds in the form of metallo porphyrin. Asphaltenes and metallic contaminants are very poisonous to hydrocarbon conversion catalysts. When heavy oils containing such poisonous materials are to be hydrodesulfulized or hydrocracked with catalyst, the pores of the catalyst used become clogged and the activity of the catalyst is lost in a short time. Therefore to maintain the activity of the hydrocarbon conversion catalysts at a high level for a long period, previous removal of such metallic contaminants from heavy oils is preferred.

In view of the fact that metallic contaminants in heavy oils are mainly contained in asphaltenes, in this art there has been prevailing the thinking that, as demetallization catalysts, catalysts having a large pore size sufficient for hydrocracking the greater part of the asphaltenes and also having large amounts of active metal components are effective. When this demetallization catalyst is used, the hydrocracking catalyst and hydrodesulfurizing catalysts on the downstream side of the demetallization step are surely guarded from poisoning due to metallic contaminants. But there is an objectionable point that the high desulfurization activity of such demetallization catalyst is lost in a short time due to metal deposit. Accordingly, viewed from the point of the overall hydrotreating process which comprises first demetallizing heavy oils and then hydrocracking or hydrodesulfurizing the same, it is not always recommendable to use the catalysts having a large pore size and containing active metals in large amounts in the demetallization step.

The present invention relates to the improvement of the overall process for hydrotreating heavy oils by using the catalyst having a small pore size and containing active metals in small amounts as compared with the conventional demetallization catalysts in the demetallization step and using the catalyst having a large pore size and containing active metals in large amounts as compared with the conventional hydrodesulfurization catalysts or hydrocracking catalysts in the hydrodesulfurization step or hydrocracking step.

Since asphaltenes in heavy hydrocarbon oils are subjected to thermal dissociation under high temperature and high hydrogen pressure are connected into relatively low molecular weight molecules, the demetallization catalyst having a small pore size can effectively remove the metallic contaminants from the relatively low molecular weight asphaltenes that have already been subjected to thermal dissociation and also the other metallic contaminants rich in reactivity. The metallic contaminants not removed in the demetallization step, as a matter of course, are fed to the hydrodesulfurization step or hydrocracking step. However, as the catalyst used in said step has a relatively large pore size and additionally contains relatively large amounts of active metals, there is little possibility of the hydrodesulfurization or hydrocracking being severely disturbed.

SUMMARY OF THE INVENTION

According to the present invention, there is provided a hydrotreating process which comprises the steps of demetallizing a heavy hydrocarbon oil containing asphaltenes and metals under the operating conditions in the range of average reaction temperature 375°–440° C., hydrogen partial pressure 70–230 Kg/cm$^2$, hydrogen flow rate 500–2000 Nm$^3$(hydrogen)/Kl(hydrocarbon oil) and LHSV 0.1–4 hr$^{-1}$ in the presence of a catalyst composition comprising at least two or more oxides of metals selected from the metals of Group VIB, Group VB and Group VIII of the Periodic Table supported on a carrier material, said carrier material consisting essentially of $\gamma$ alumina, the whole amount of said melal oxides being 10 Wt % or less, and having a pore structure satisfying the requirements (a), (b) and (c), and thereafter hydrotreating said demetallized hydrocarbon oil under the operating conditions in the same range as mentioned above in the presence of a catalyst composition comprising at least two oxides of metals selected from Group VIB and Group VIII of the Periodic Table supported on a $\gamma$-alumina carrier or alumina carrier containing zeolite, the whole amount of said metal oxides being 30 Wt % or less, and having a pore structure satisfying the requirements (a), (b) and (c) as follows:

(a) when measured by the nitrogen adsorption method, pores whose diameters are in the range of 0–600 Å have an average diameter of 100–180 Å, the total volume occupied by pores whose diameters are in the range of average diameter ±20 Å is at least 60% of that occupied by pores whose diameters are 0–600 Å, the total volume occupied by pores whose diameters are 50 Å or less is 10% or less of that occupied by pores whose diameters are 0–600 Å, the total volume occupied by pores whose diameters are in the range of 200–300 Å is 5% or less of that occupied by pores whose diameters are 0–600 Å, and the total volume occupied by pores whose diameters are 300 Å or more is 3% or less of that occupied by pores whose diameters are 0–600 Å, (b) when measured by means of a high pressure mercury porosimeter, pores whose diameters are in the range of 62–600 Å have an average diameter of 100–170 Å, the total volume occupied by pores whose diameters are in the range of average diameter ±20 Å is at least 70% of the volume occupied by pores whose diameters are 62–600 Å, the volume occupied by pores whose diameters are 100 Å or less is 10% or less of that occupied by pores whose diameters are 62–600 Å, and the volume occupied by pores whose diameters are 200 Å or more is 5–15% of that occupied by pores whose diameters are 62–600 Å, and (c) the specific surface area is 170–270 m²/g, and the volume occupied by the pores (whose diameters are 600 Å or less) is 0.57–0.95 ml/g.

BRIEF DESCRIPTION OF THE DRAWINGS

FIG. 1 and FIG. 2 are graphs showing the experimental results obtained from Evaluation Test Example 1–9.

DETAILED DESCRIPTION OF THE INVENTION

Figure 1:
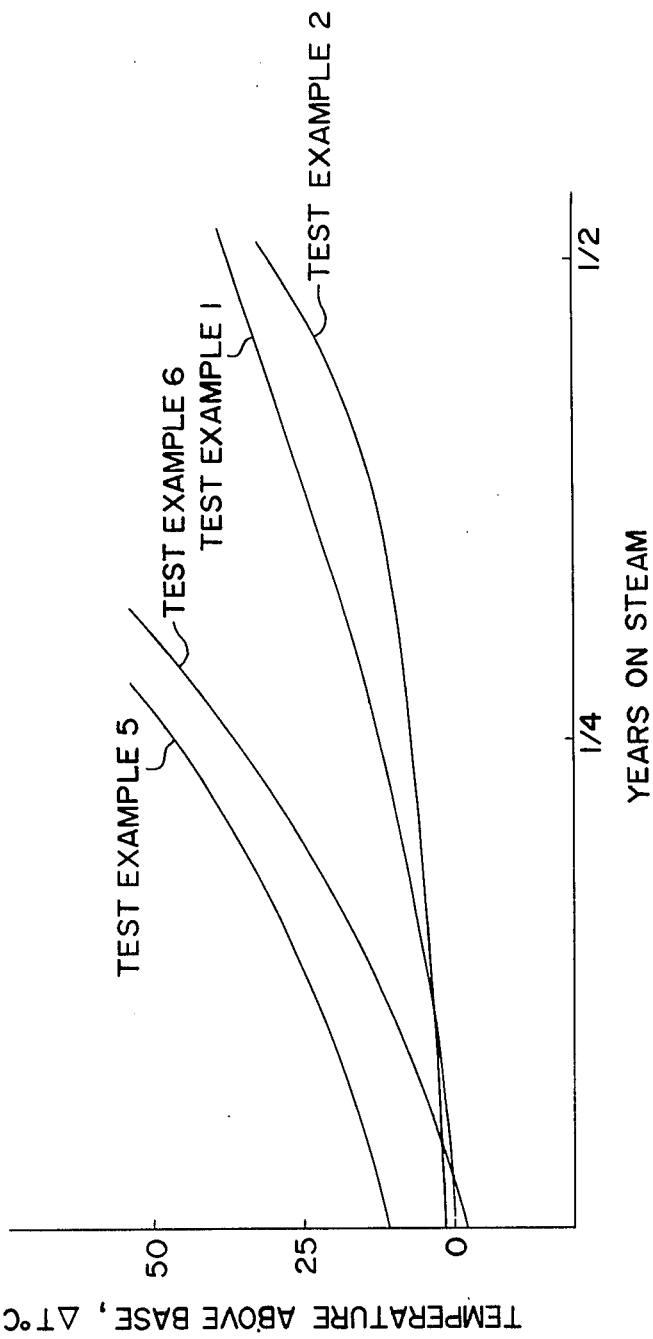

Since the demetallization catalyst used in the present invention is controlled in its demetallizing activity, the metals being rich in reactivity in heavy hydrocarbon oils deposit uniformly to the inside of the catalyst particles without selectively depositing on the outer surface or at the portions near the surface of the catalyst particles. Further, deposit of metals caused by cracking of asphaltenes is considerably small. Therefore, even when the catalyst of the present invention is utilized for a long period, the localization of deposited metals is not found on the surface of and at the portions near the surface of the catalyst particle. This can be certified by measuring the distribution of metals in the long-used catalyst by means of the X-ray micro-analyzer. In the spent demetallization catalyst of the present invention, metals such as vanadium, nickel and the like are distributed uniformly to the inside of the catalyst particle, whilst in the conventional demetallization catalysts, metals are distributed mainly inside 200μ from the catalyst particle surface. Accordingly, the use of the demetallization catalyst of the present invention can prevent the pores of the catalyst from clogging and permits the utilization of the catalyst particle effectively to the inside thereof, whereby a large amount of deposited metal can be maintained, and further the process can be operated stably for a long period due to absence of solidification and blockage between catalyst particles.

In the present invention, it is important that the hydrotreating catalyst to be used in combination with said hydrodemetallization catalyst should have the same pore characteristic as the latter has. As conventional hydrotreating catalysts have mainly aimed at hydrodesulfurization and hydrocracking and have high desulfurizing and cracking activities, said catalysts exhibit a high activity in cracking asphaltenes, too. As a result, there is the peril that an excessive demetallization reaction takes place without effective diffusion of the metal into the inside of the catalyst pores and metal deposits at the inlet of the catalyst pores to thereby block the pores and deteriorate the activity. Contrarily, in the present invention, where hydrotreating is first carried out using the hydrodemetallization catalyst and thereafter hydrotreating is carried out using the hydrotreating catalyst with the same pore diameter as the hydrodemetallization catalyst, it is possible to crack the asphaltenes containing hard-to-react metals by using the hydrotreating catalyst and to carry out a stable operation for a long period because there is little possibility of metals depositing only at the inlet of the pores of the catalyst and accordingly the pores being scarcely clogged.

As the carrier material for use in the demetallization catalyst of the present invention γ-alumina obtained from boehmite gel is used. In order to maintain the characteristics such as demetallizing activity and selectivity, furthermore, there are normally utilized, as active components, metal oxides for use in hydrocracking catalysts for hydrocarbons, and preferably at least two members or more of oxides of Mo and W of Group VIB, V of Group VB and Ni, Co and Fe of Group VIII of the Periodic Table are carried on said γ alumina in the amount of 10 wt % or less, preferably 5 wt % or less as the total amount of metal oxides. Of the demetallization catalysts according to the present invention, the catalyst prepared by carrying, on the γ alumina carrier, a small amount of vanadium compound which selectively attracts and stores V and Ni contained in heavy oils and further adding small amounts of Ni, Mo and W thereto in order that said catalyst may have the cracking and hydrogenating activities of asphaltenes to some extent is most preferable because said catalyst suppresses the hydrodesulfurization reaction and hydrocracking reaction to bring about the demetallization reaction preferentially.

The hydrodesulfurization catalysts used in the present invention employ the γ-alumina as carrier which has substantially the same physical properties as the above mentioned demetallization catalyst. On the other hand, as the carrier used for the hydrocracking catalyst there is employed the one prepared by mingling the carrier for the hydrodesulfurization catalyst with such a tertiary component as zeolite. Both the hydrodesulfurization catalyst and hydrocracking catalyst employ, as the active metals, at least two members or more oxides of Mo and W of Group VIB and Co, Ni and Fe of Group VIII, and the total amount of said metal oxides is arranged to be 30 wt % or less, preferably 20 wt % or less.

The demetallization catalyst, hydrodesulfurization catalyst and hydrocracking catalyst used in the present invention preferably should have such a pore structure wherein heavy hydrocarbon oils can effectively enter into even the inside of the catalyst particle and diffuse and at the same time should have the large external surface area of the catalyst particles so as to diffuse the oils effectively. It is preferable that the external surface area of the catalyst be increased to thereby maintain its reaction activity and prevent or delay clogging of pores due to metal deposit. For that purpose, it is an effective means to extrude the catalyst into a small sized particle or to form many projections thereon to increase the external surface area per particle weight. Specifically in concrete, it is profitable that the catalyst is extruded into a pillar whose cross-section at a right-angled to the direction of extruding is of a three-leaved or four-leaved shape inscribing a circle having a diameter of ⅛"–1/32". This can achieve the same effect as that obtained by congregating finely divided catalyst particles and can increase the external surface area, thereby increasing the activities of various hydrogen consuming reactions including hydrodesulfurization and hydrodemetallization. These extrusion moldings, apparently weaken the crushing strength of the extrudates, are found to have such an unexpected effect that their crushing strength increases. Further, it is generally known that the use of these catalysts can reduce pressure loss as compared with the use of cylindrical catalysts. The packed density of the catalyst in the present invention is 0.50–0.65 g/cc.

The preferable operating conditions in the present invention are as follows:

The average temperature in both hydrodemetallization reaction and hydrodesulfurization (or hydrocracking) reaction zones is 340°–450° C., preferably 375°–440° C.; hydrogen partial pressure is 40–250 Kg/cm², preferably 70–240 Kg/cm²; hydrogen flow rate is 500–2000 Nm³/Kl and LHSV is 0.1–5.0 hr⁻¹, preferably 0.2–4.0 hr⁻¹. Further, the ratio of said hydrodemetallization catalyst to the hydrodesulfurization catalyst or hydrocracking catalyst is 5-60 vol %, preferably 10-50 vol %.

To sum up, the usual idea that demetallization catalysts with large pore diameters are necessary for the hydrodemetallization reaction is found to be not always correct. As shown in the present invention, asphaltenes are dissociated. Therefore, to remove metals contained therein efficiently, these require catalysts having characteristic active components and physical properties. And, as the active components and composition of the hydrodemetallization catalysts used in the present invention are selected from the point of the hydrodemetallization reaction rather than the hydrodesulfurization reaction, there can be brought about the following advantages that no excess demetallization reaction takes place at the inlet of the pore of the catalyst and no pore clogging is caused due to restricted pore diameters and pore volume, whereby the life of catalysts can be prolonged and further the hydrodesulfurization catalysts and hydrocracking catalysts used in combination with the demetallization catalysts can be protected from metals so as to maintain their activities to the full.

For the purpose of explaining the present invention in more detail, there will be enumerated concrete examples hereinafter. However, it is to be noted that these examples are enumerated by way of explanation alone. Therefore, the present invention should not limited thereto. The hydrodemetallization catalyst and the hydrodesulfurization catalyst and hydrocracking catalyst used in combination therewith are prepared as follows.

EXAMPLE 1

80 Kg of a sodium aluminate solution having a concentration of 5 wt % based on alumina was admixed with 93.0 Kg of an aluminum sulfate solution having a concentration of 2.5 wt % based on alumina in about 10 minutes, and its final pH was regulated to 7.2. This alumina slurry was filtrated and was poured with about 120 Kg of a 0.2 wt % ammonia water to wash out sodium sulfate. The thus obtained alumina hydrate comprising pseudo-boehmite was added with water so as to regulate its pH to be 10 or more. The same was aged at 95° C. for 20 hrs. This alumina hydrate was heated and concentrated by means of a kneader and a dough was obtained. This dough was molded into a three leaf shaped matter inscribing a circle having a diameter of 1/22" by means of an extruder. This shaped matter was dried at 150° C. for 16 hr and calcined at 550° C. for 3 hours to obtain Catalyst Carrier (X).

In order to carry 1.5 wt % of vanadium pentoxide and 1.5 wt % of nickel oxide on 500 g of Carrier (X) there was prepared an impregnation solution by mixing 10 g of ammonium meta-vanadate and 14.2 g of nickel carbonate with a proper amount of water and heating them at 95° C. The carrier was impregnated with this impregnation solution by spraying. Thereafter, the same was dried while elevating the temperature gradually from room temperature to 250° C., and then was calcined at 550° C. for 1 hour to thereby obtain Catalyst (A). This Catalyst (A) is a hydrodemetallization catalyst.

EXAMPLE 2

In order to carry 10.5 wt % of molybdenum oxide, 1.23 wt % of cobalt oxide and 0.7 wt % of nickel oxide on 500 g of Carrier (X) there was prepared an impregnation solution by adding 60.0 g of ammonium paramolybdenate, 27.3 g of cobalt nitrate, 15.7 g of nickel nitrate and 277 g of a 15% $NH_4OH$ to water and dissolving. Carrier (X) was impregnated with the impregnation solution by spraying, thereafter was dried while elevating the temperature gradually from room temperature to 250° C., and then was calcined at 550° C. for 1 hr to thereby obtain Catalyst (B). This Catalyst (B) was a hydrodesulfurization catalyst.

EXAMPLE 3

By mixing 50 wt % of zeolite with the alumina dough obtained According to Example 1, there was prepared a zeolite containing dough. This dough was molded into a three leaf shaped matter inscribing a circle having a diameter of 1/22". The same was dried at 150° C. for 16 hours and calcined at 550° C. for 3 hours. This is named Carrier (Y).

103.3 g of ammonium paratungstate, 60.5 g of nickel carbonate and 100 g of malic acid were mixed and heated at 95° C. to prepare an impregnation solution so that tungsten oxide and nickel oxide may be 15.0 wt % and 3.75 wt % respectively against 500 g of Carrier (Y). The carrier was impregnated with this impregnation solution by spraying, thereafter was dried while elevating the temperature gradually from room temperature to 250° C., and then was calcined at 550° C. for 1 hour to thereby obtain Catalyst (C). This Catalyst (C) is a hydrocracking catalyst.

COMPARATIVE EXAMPLE 1

The dough according to Example 1 was admixed with 10 wt % of sericite and carboxymethyl cellulose, thereby obtaining a dough again. This dough was molded into a three leaf shaped matter inscribing a circle having a diameter of 1/22" was dried at 150° C. for 16 hours and was calcined at 550° C. for 3 hours. This is named Catalyst Carrier (Z). A catalyst was prepared by supporting the same metal components on 500 g of Carrier (Z) and using the same procedure as Example 2. This catalyst is named (D). This Catalyst (D) is a hydrodesulfurization catalyst.

COMPARATIVE EXAMPLE 2

A catalyst was prepared by supporting the same metal components on 500 g of Carrier (Z) and using the same procedure as Example 1. This catalyst is named (E). Catalyst (E) is a hydrodemetallization catalyst.

COMPARATIVE EXAMPLE 3

A carrier was obtained by using the same alumina preparation procedure as Example 1 such, for instance, as alumina concentration and respective, steps except that the aging step was conducted at 95° C. for 10 hours. This carrier is named (W). A catalyst was prepared by depositing the same metal components on 500 g of Carrier (W) and using the same procedure as Example 2. This catalyst is named (F). This Catalyst (F) is a hydrodesulfurization catalyst.

COMPARATIVE EXAMPLE 4

A catalyst was prepared by supporting the same metal components on Carrier (W) and using the same procedure as Example 1. This catalyst is named (G). This Catalyst (G) is a hydrodemetallization catalyst.

The physical properties of the above mentioned Catalysts (A)–(G) are as shown in Table 1.

TABLE 1

Physical properties of respective catalysts

| Characteristics | A | B | C | D | E | F | G |
|---|---|---|---|---|---|---|---|
| type*[1] | HDM | HDS | HYC | HDS | HDM | HDS | HDM |
| SA(m²/g) | 220 | 213 | 252 | 158 | 165 | 270 | 278 |
| PV(cc/g) | 0.70 | 0.66 | 0.64 | 0.97 | 1.02 | 0.50 | 0.54 |
| N₂ adsorption method | | | | | | | |
| av.PD(Å) | 149 | 122 | 112 | 195 | 208 | 74 | 96 |
| av.PD ± 20 | 69 | 71 | 65 | 19 | 11 | 58 | 52 |
| 0–50 | 2 | 2 | 3 | 2 | 2 | 5 | 6 |
| 50–100 | 12 | 21 | 32 | 12 | 13 | 65 | 52 |
| 100–200 | 85 | 77 | 63 | 40 | 32 | 30 | 42 |
| 200–300 | 1 | 0 | 2 | 27 | 20 | 0 | 0 |
| 300+ | 0 | 0 | 0 | 19 | 33 | 0 | 0 |
| High pressure mercury porosimeter | | | | | | | |
| av.PD(Å) | 127 | 113 | 102 | 180 | 200 | 74 | 78 |
| av.PD ± 20 | 85 | 88 | 70 | 29 | 24 | 70 | 71 |
| −100 | 7 | 6 | 9 | 7 | 4 | 88 | 89 |
| 100–200 | 87 | 88 | 76 | 42 | 45 | 8 | 6 |
| 200–300 | 2 | 3 | 10 | 36 | 32 | 3 | 4 |
| 300+ | 4 | 3 | 5 | 15 | 19 | 1 | 1 |
| ABD(g/cc) | 0.56 | 0.58 | 0.63 | 0.49 | 0.46 | 0.69 | 0.66 |

*[1] HDS = Hydrodesulfurization catalyst
HDM = Hydrodemetallization catalyst
HYC = Hydrocracking catalyst The undermentioned Evaluation Test Examples 1–9 explain the catalytic activity and life in respect of the case of combining the hydrodemetallization catalyst with the hydrodesulfurization catalyst or hydrocracking catalyst according to the present invention which have defined physical properties and active components, and the other case of combining the control hydrodemetallization catalyst with the hydrodesulfurization catalyst or hydrocracking catalyst.

EVALUATION TEST EXAMPLE 1

Hydrodesulfurizing and hydrodemetallizing activity tests were carried out using a fixed bed flow type experimental equipment. As a guard catalyst reaction tube there was employed a tube of 19.2 mmφ in inside diameter and 1200 mm in length and has been filled with 100 g of catalyst. To this tube was connected a main reaction tube that is 19.2 mmφ in inside diameter and 3000 mm in length and has been filled with 300 g of catalyst and acts to carry out hydrodesulfurization or hydrocracking reactions. The whole reaction conditions therefor are enumerated as follows:

| | |
|---|---|
| Pressure | 150 Kg/cmG |
| LHSV | 0.25 hr⁻¹ |
| H₂/HC | 700 m³/Kl |
| Temperature | 370–420° C. |
| Hydrogen concentration | 90 mol % |

The feed oil used was AH.RC as follows:

| | |
|---|---|
| Specific gravity (15/4° C.) | 0.99, |
| Viscosity (at 50° C). | 2900 cst, |
| Residual carbon | 15 wt %, |
| Asphaltene content | 8.2 wt %, |
| Sulfur content | 4.1 wt %, |
| Nitrogen content | 0.3 wt %, and |
| Metal content (vanadium + nickel) | 130 ppm |

The feed oil was pressurized to a predetermined pressure by means of a high pressure pump and the hydrogen gas was pressurized to a predetermined pressure by means of a compressor. Both were mixed and fed to the reaction tube. The mixture of oil and gas coming out of the reaction tube was fed to a gas-liquid separator, and the oil was drawn off at regular intervals. The amounts of sulfur, asphaltene, metals, carbon and the like contained in these oils were analyzed according to the conventional method. In this case, the hydrodemetallization catalyst (A) was used in combination with the hydrodesulfurization catalyst (B) in the volume ratio of 40:60.

EVALUATION TEST EXAMPLE 2

The test was carried out under the same operating conditions as Evaluation Test Example 1. In this case, the hydrodemetallization catalyst (A) was used in combination with the hydrocracking catalyst (C) in the volume ratio of 40:60.

EVALUATION TEST EXAMPLES 3–9

Tests were carried out under the same operating conditions as Evaluation Test Example 1. In this case, the hydrodemetallization catalyst was used in combination with the hydrodesulfurization catalyst or hydrocracking catalyst in the volume ratio of 40:60.

| Test example | Hydrodemetallization catalyst | Hydrodesulfurization or hydrocracking catalyst |
|---|---|---|
| 3 | — | (B) |
| 4 | (E) | (B) |
| 5 | (A) | (D) |
| 6 | (A) | (F) |
| 7 | (G) | (B) |
| 8 | (B) | (C) |
| 9 | (D) | (C) |

FIGS. 1–2 and Table 2 show the data on the activity resulting from the combinations of various hydrodemetallization catalysts with various hydrodesulfurization catalysts or hydrocracking catalysts.

TABLE 2

Reaction activity shown by combined catalysts
(at intermediate time of the reaction)

| Activity | Test Example | | | | | | | | |
|---|---|---|---|---|---|---|---|---|---|
| | 1 | 2 | 3 | 4 | 5 | 6 | 7 | 8 | 9 |
| $C_5$ - 375° F. (vol %) | 2 | 2 | 2 | 2 | 2 | 2 | 2 | 3 | 3 |
| 375-650° F. (vol %) | 18 | 32 | 13 | 14 | 9 | 11 | 9 | 29 | 30 |
| 650° F. (vol %) | 83 | 60 | 85 | 84 | 87 | 85 | 86 | 60 | 60 |
| Desulfurization rate (%) | 92 | 97 | 86 | 86 | 83 | 85 | 84 | 99 | 94 |
| Deasphalted rate (%) | 43 | 60 | 43 | 43 | 44 | 41 | 41 | 58 | 58 |
| Denitrification rate (%) | 40 | 57 | 36 | 37 | 35 | 35 | 36 | 54 | 55 |
| Demetallization rate (%) (Ni + V) | 73 | 83 | 75 | 74 | 80 | 77 | 73 | 83 | 86 |

Table 2 shows the desulfurizing rate, deasphalting rate and demetallizing (Ni+V) rate from the feed oil at the intermediate time of the reaction based on the reaction temperature in Evaluation Test Example 1, while the drawings show the catalyst life by plotting the reaction temperature for obtaining a target desulfurization rate against time. It can be ascertained from these test results that a conspicuous difference in life exists in combinations of the hydrodemetallization catalyst (A) and hydrodesulfurization catalyst (B) in Test Example 1 and the hydrodemetallization catalyst (A) and hydrocracking catalyst (C) in Test Example 2 according to the present invention in comparison with the combinations of the control catalysts.

In other words, it can be seen that a very conspicuous difference can not be observed from Table 2 at the intermediate time of the reaction, but a conspicuous difference appears in respect of life in FIGS. 1-2 at the end of the reaction.

As is evident from the above evaluation test results, the present invention makes it possible to retard the deterioration in catalyst activity by hydrodemetallizing with a specific hydrodemetallization catalyst and then hydrotreating with a specific hydrotreating catalyst.

As described above, the present invention can remove the metal and asphaltene in heavy oils with the hydrodemetallization catalyst and hydrotreating catalyst efficiently and consequently can maintain the activity for a long period without failing in hydrodesulfurization or hydrocracking.

We claim:

1. A two-stage hydrotreating process for treating a heavy hydrocarbon oil containing asphaltenes and metals, and wherein hard-to-react metals are contained in said asphaltenes, which comprises the steps of: in the first stage, partially demetallizing said heavy hydrocarbon oil by contacting said oil with hydrogen, under the operating conditions of an average reaction temperature of 375°-440° C., a hydrogen partial pressure of 70-230, Kg/cm², a hydrogen flow rate of 500-2000 Nm³ (hydrogen)/Kl (hydrocarbon oil) and an LHSV of 0.1-4 hr⁻¹, in the presence of a first catalyst composition consisting essentially of at least two oxides of metals selected from the group consisting of the metals of Group VB and Group VIII of the Periodic Table, at least one of said metal oxides being an oxide of vanadium, which metal oxides are supported on a first carrier consisting essentially of γ-alumina, the amount of said metal oxides being 10 wt % or less based on the weight of said first catalyst composition, said first catalyst composition having a pore structure satisfying the requirements (a), (b) and (c) set forth hereinafter, said first catalyst having a controlled demetallizing activity so that it is effective to remove easily reactive metals and deposit them in the interiors of the particles of said first catalyst, said first catalyst being substantially ineffective to crack said asphaltenes containing hard-to-react metals so that the hard-to-react metals contained in uncracked asphaltenes are not removed; and thereafter, in the second stage, hydrotreating the partially demetallized hydrocarbon oil by contacting said partially demetallized hydrocarbon oil with hydrogen, under the same operating conditions as as defined above, in the presence of a second catalyst composition comprising at least two oxides of metals selected from the group consisting of the metals of Group VIB and Group VIII of the Periodic Table, which metal oxides are supported on a second carrier, said second carrier consisting of γ-alumina or alumina containing zeolite, said zeolite being a zeolite that is effective for use as a catalyst carrier of a catalyst for hydrotreating processes, the amount of said metal oxides being 30 wt. % or less based on the weight of said second catalyst composition, the content of said metal oxides in said first catalyst composition being less than the content of said metal oxides in said second catalyst composition, said second catalyst being effective to crack said asphaltenes so that said hard-to-react metals are removed and are deposited in the interiors of the particles of said second catalyst, said second catalyst composition having a pore structure satisfying the following requirements (a), (b) and (c):

(a) when measured by the nitrogen adsorption method, pores whose diameters are in the range of 0-600 Å have an average diameter of 100-180 Å, the total volume occupied by pores whose diameters are in the range of the average diameter ±20 Å is at least 60% of that occupied by pores whose diameters are 0-600 Å, the total volume occupied by pores whose diameters are 50 Å or less is 10% or less of that occupied by pores whose diameters are 0-600 Å, the total volume occupied by pores whose diameters are in the range of 200-300 Å is 5% or less of that occupied by pores whose diameters are 0-600 Å, and the total volume occupied by pores whose diameters are 300 Å or more is 3% or less of that occupied by pores whose diameters are 0-600 Å, (b) when measured by means of a high pressure mercury porosimeter, pores whose diameters are in the range of 62-600 Å have an average diameter of 100-170 Å, the total volume occupied by pores whose diameters are in the range of average diameter ±20 Å is at least 70% of the volume occupied by pores whose diameters are 62-600 Å, the volume occupied by pores whose diameters are 100 Å or less is 10% or less of that occupied by pores whose diameters are 62-600 Å, and the volume occupied by pores whose diameters are 200 Å or more is 5-15% of that occupied by pores whose diameters are 62-600 Å, (c) and the specific surface area is 170-270 m²/g, and the volume occupied by pores having a diameter of 600 Å or less, is 0.57-0.95 ml/g.

2. A process according to claim 1 wherein said hydrotreating step is hydrodesulfurization.

3. A process according to claim 1 wherein the hydrotreating step is hydrocracking.

4. A process according to claim 1 wherein the catalyst compositions used in the demetallizing step and hydrotreating step are each extrusion-molded into a pillar whose cross-section at a right angle to the direction of extrusion is of a three-leaved or four-leaved shape inscribed within an imaginary circle having a diameter of 1/8″–1/32″ and the packed density of the catalysts in the demetallizing and hydrotreating zones is 0.50–0.65 g/ml.

5. A process according to claim 1 wherein the metals of Group VIB of the Periodic Table are Mo and W, and the metals of Group VIII thereof are Ni, Co and Fe.

6. A process as claimed in claim 1 in which the volume of said first catalyst composition is from 5 to 60 vol. %, based on the sum of the volumes of said first and second catalyst compositions.

* * * * *